F. W. HOFFMAN.
VEHICLE BODY.
APPLICATION FILED JAN. 14, 1916.
1,257,605.
Patented Feb. 26, 1918.
2 SHEETS—SHEET 1.
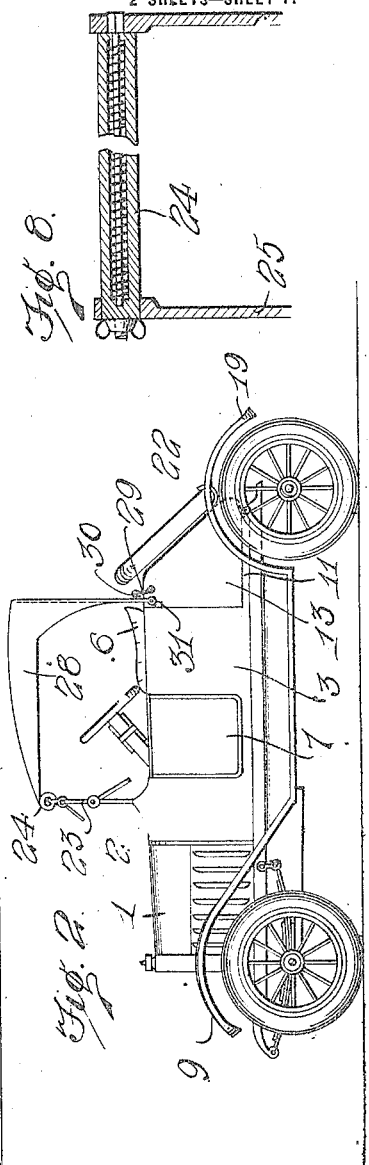
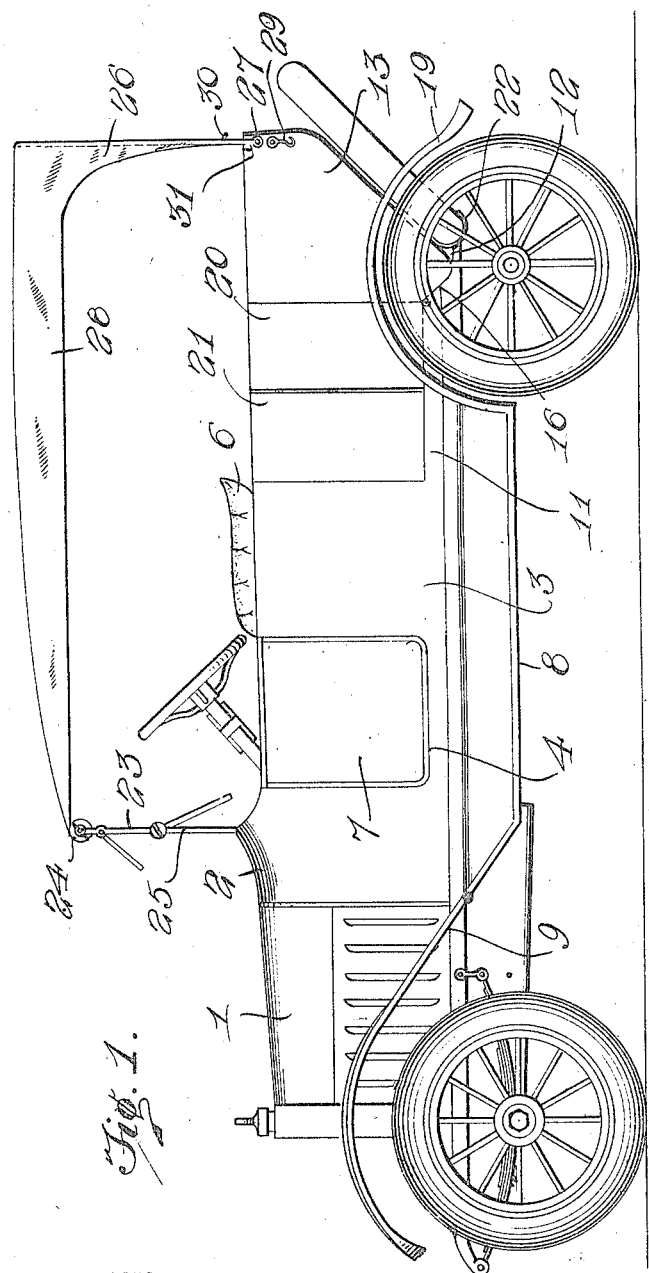
WITNESSES
INVENTOR
Fred W. Hoffman
BY
ATTORNEY

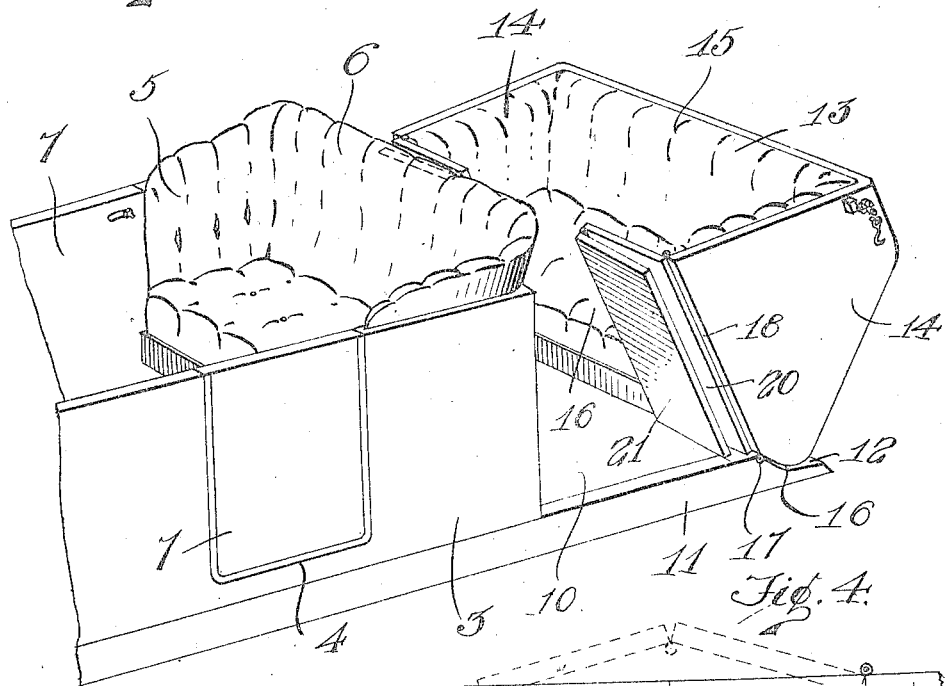
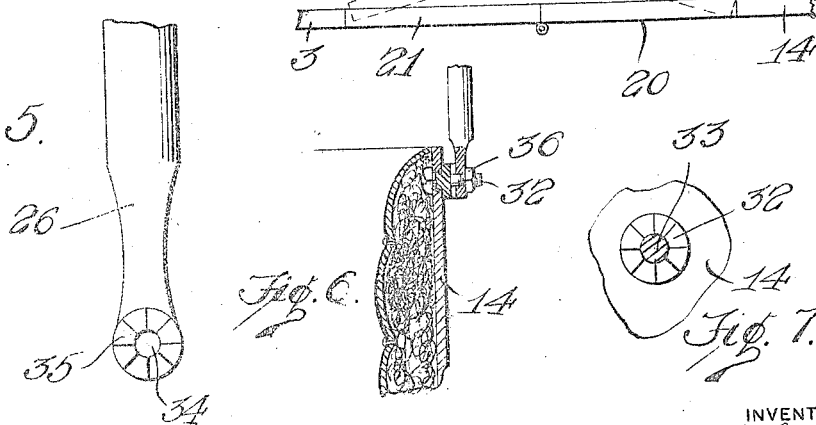

UNITED STATES PATENT OFFICE.

FRED W. HOFFMAN, OF GOLDROAD, ARIZONA.

VEHICLE-BODY.

1,257,605.

Specification of Letters Patent.

Patented Feb. 26, 1918.

Application filed January 14, 1916. Serial No. 72,150.

*To all whom it may concern:*

Be it known that I, FRED W. HOFFMAN, a citizen of the United States, residing at Goldroad, in the county of Mohave and State of Arizona, have invented certain new and useful Improvements in Vehicle-Bodies, of which the following is a specification.

An object of my invention is to provide a vehicle body which has a rear seat so arranged that the same may be swung down to a closed position where it will form a portion of the body design, or may be raised to the open position to be used as a second seat.

A further object is to so construct a top arranged for the vehicle that the top will be taken up or extended to meet the requirements in the adjustment of the rear portion, as the parts may be set to form a two-seated or a single seated body.

With other objects in view, my invention consists in such novel features of construction and combinations of parts to be hereinafter set forth in connection with the accompanying drawings and then pointed out in the claims.

In the drawings:

Figure 1 is a view in side elevation of a motor vehicle having the invention applied thereto and with the parts set so that a two-seated or touring model or body is provided.

Fig. 2 is a view similar to Fig. 1 showing the parts in the closed relation in which the body partakes of a roadster design.

Fig. 3 is a fragmentary perspective view to better illustrate the details of construction.

Fig. 4 is a detail view in top elevation of the doors showing the manner of hinging the same.

Fig. 5 is a view of the lower end of one of the top braces showing a modified form which the same might take.

Fig. 6 is a transverse sectional view through the modified construction.

Fig. 7 is a view in elevation of the rosette which would be applied to the body in the use of the structure illustrated in Figs. 5 and 6.

Fig. 8 is a detail sectional view showing the roller by which the top is permitted to be taken up and extended.

In the present disclosure I have illustrated my invention as applied to a motor vehicle, although it will be understood that the device of the invention is equally applicable to a horse-drawn or other vehicle. The forward part of the body comprises the engine hood 1 which is followed by the cowl 2 and the sides 3, which latter have the door openings 4 provided therein. A seat 5 is provided between the sides 3 of the body, and the back 6 of this seat is extended entirely across between the sides. The doors 7 are hinged at one side adjacent the door openings to close therein, and the running-board 8 and the forward wheel guards 9 may be of standard form.

The sides 3 are stopped short adjacent the back 6 of the seat 5 and the rigid structure is continued in a floor 10 which is positioned substantially on the frame 11 extending rearwardly at each side of the body.

The angle thus formed between the rear edges of the sides 3 of the body and the frame members 11 is substantially a right angle and if desired the rear side of the back 6 of the forward seat 5 may be finished in accordance with the accepted standard of vehicle construction, the essential feature being that the back 6 not project beyond the rear edges of the sides 3 adjacent the upper edges thereof. The extreme rear ends of the frame members 11 are given a gradual curve outwardly and downwardly, but are made sufficiently strong that the stop portions 12 thereof will support a considerable weight and if desired the body construction might be continued across between the supporting ends 12 and these ends thus work into a part of the body design. A hood shaped seat member 13 has the side members 14 thereof made substantially triangular in form, and shaped to have the back member 15 connected thereacross and also the seat portion 16. One of the edges of the hood shaped seat member 13 is rolled and shaped as at 16′ to have substantially the same form as that taken by the curve of the supporting ends 12 of the frame members 11, and the seat member is hinged as at 17 to the frame members 11 so that the rolled portion 16 of the seat member will be adjacent the shaped supporting portions of the frame members. The back and seat 15 and 16′ are preferably upholstered in a material to match the upholstery of the forward seat 5, so that when the rear seat is used, the uniformity of design and construction will be further carried out.

When the body is to be used as a roadster or single seated model, the hood like seat member 13 will be swung down to have the side members 14 thereof close within the angular opening left between the rear edges of the side members 3 of the body and the frame portions 11, and in this adjustment the body will partake of the design shown in Fig. 2. When the rear seat is to be used, the portion 15 is raised to a position that the rolled formation 16 thereof rests against the supported ends 12 of the frame 11 and the parts will then have the relative positioning shown in Fig. 1. As the hood 13 is swung to the raised position, a door opening is provided between the edges 18 of the side members 14 thereof and the rear edges of the side members 3 of the body, and it is preferable that a door be provided to close this opening when the body is adjusted to be of the touring model and to yet be out of the way when the hood is closed to make a roadster body. The rear wheel guards 19 will in some makes of machine extend across the door opening thus provided, and for this reason it is not possible to hinge a single door on the edge 18 to have outward swinging movement. To overcome this difficulty, a door member 20 is hinged on the edge 18 of the side members of the hood 13 at each side and is made of a transverse dimension to extend approximately half way across the door opening, a second door member 21 being hinged to each of the door members 20 to fill in the remainder of the door opening and to also be capable of swinging movement to fold against the door members 20. It is preferable that the door members 20 be hinged to fold inwardly while the door members 21 are hinged to fold outwardly and thus come against the members 20, and in this way the doors may be folded within the hooded rear seat portion in the manner shown in Fig. 3 to permit this hood 13 to be closed through the relation shown in Fig. 2, and further when a person desires to alight from the vehicle through one of the door openings from the rear seat, only the door members 21 may be opened if sufficient space is provided this way, or if it is desired to clear the entire opening, this can be accomplished by folding the doors one against the other. If desired a tire rack 22 may be mounted on the hood portion 13, a storage compartment may be formed in the hood to be accessible from the interior of the vehicle, or a storage compartment might be formed in this space and a door provided to permit access from the exterior, these of course, being features which pertain more particularly to the design than the subject matter of my invention.

A windshield 23 is rigidly mounted on the cowl 2, and a winding roll 24 is mounted between the side members 25 of the windshield so that this winding roll 24 will be disposed transversely across the upper end of the side members 25 across the body of the machine at the upper end of the side members 25. A top bow 26 is pivotally mounted at 27 on the side members 14 of the hood 13 at a point adjacent the upper edge of the back 15, and a top 28 is fashioned over this bow 26 and is extended forwardly over the body of the car to be received around the winding roll 24. Hooks 29 are carried by the hood 13 to be engaged through the eyes 30 carried by the sides of the bow member 26 when the hood 13 is moved to the position shown in Fig. 2, and stops 31 are provided to be engaged by the ends of the bow 26 as the hood 13 is swung to a position to form the touring body. The winding roll 24 may be made of the spring type so that the slack in the top 25 as the hood 13 is closed will be taken up automatically, or this winding roll 24 may be provided with a handle by which the same may be turned to wind the excess length of the top 28 thereonto, and in either or both adaptations, some form of stop similar to the stop employed on the usual form of curtain or shade roll may be fitted to hold the roll in the desired adjusted position.

In Figs. 5 to 7 inclusive, I have illustrated a slightly modified form of the means by which the top bow 26 may be mounted on the hood 13 and held in the proper adjusted position. As is here shown, the side parts 14 of the hood 13 have a rosette clamping member 32 mounted thereon with the screw-threaded stud projecting from the clamping member. The ends of the top bow 26 have openings 34 provided therethrough to receive the stud 33 and the remaining half of the rosette clamping portion is formed at 35 around its central opening 34. The top bow is mounted with the ends pivoted on the studs 33 and when the top has been brought to the proper adjusted position, it is held in this adjustment by a nut 36 which is screwed onto the stud 33 to hold the clamping portion 35 in locked engagement with the clamping portion 32.

From the foregoing it will be seen that I have provided a body construction which is perhaps particularly well adapted for use on motor vehicles and which has the parts thereof so constructed and arranged that in the closed relation, the body partakes of a roadster or single seated design, and when the parts are opened out, a two-seated or touring car is provided. Further it will be noted that the top is so constructed that it will operate equally efficiently with either setting of the body parts, and that the excess top when the single seat arrangement is used is taken up in a manner to dispose of the same without materially affecting the design or lines of the top.

As I have herein shown and described only specific forms of the invention, it will be understood that the doors for the rear seat might be a single member, that the top and the take-up means or winding roll might be constructed in a manner different from that set forth, and that various other modifications in the construction and combinations of parts can be resorted to, meeting the requirements of the particular make of vehicle to which the invention is to be applied, and hence I do not wish to be limited except for such limitations as may be set forth in the claims.

I claim:—

1. A vehicle having a fixed body construction in the forward part thereof, an adjustable structure carried rearwardly of the fixed body portion constructed to be closed to form a portion of the body design and upon opening to be extended to enlarge the lines of the body and provide additional seating capacity, an adjustable top frame connected with the adjustable portions of the vehicle body to be capable of fitting in the proper position in either adjustment of the body, means to hold the top frame in either of the adjusted positions, a wind shield carried by the fixed body construction, and a take up roller carried by the wind shield to automatically wind up and let out the top as adjustment is made of the adjustable structure of the body.

2. A vehicle having a fixed body construction on the forward part thereof, an adjustable structure carried rearwardly of the fixed body structure constructed to be closed to form an extension of the body design and upon being opened arranged to extend the lines of the body and provide additional seating capacity, an adjustable top frame connected with the adjustable portion of the vehicle to be capable of being set in either of the adjusted positions of the movable body structure, means to secure said adjustable top frame in a substantially upright position, a flexible top structure carried from said frame, a wind shield carried on the forward part of the vehicle body, and a spring actuated roller with which the flexible top has connection mounted on the wind shield to automatically take up the flexible top structure as the adjustable portion of the vehicle body is moved to the closed position and to permit extension of the top as the adjustable section is raised to give additional seating capacity to the vehicle.

3. A vehicle having a fixed body construction in the forward portion thereof and having the frame extending rearwardly of said body construction, a floor mounted upon the frame structure, a hood hingedly mounted on the frame structure to be swung to a closed position adjacent the fixed body construction to combine with the lines thereof and to be swung to a raised position to extend the lines of the body, a seat provided within the hood to be used as the hood is swung to the raised relation, doors hingedly connected with the said hood to be folded thereunto as the hood is to be moved to the closed position and to be expanded to form the rear doors of the body as the hood is adjusted to the raised position, a take-up roll carried on the fixed body structure, and a top mounted at one end on the adjustable hood and at the opposite end connected with the take-up roll, and means carried by the hood to hold the top in the desired operative relation in either of the adjustments thereof.

In testimony whereof I affix my signature in presence of two witnesses.

FRED W. HOFFMAN.

Witnesses:
D. E. REARDON,
ALBERT MERZ.